(12) United States Patent
Gross et al.

(10) Patent No.: US 7,910,199 B1
(45) Date of Patent: Mar. 22, 2011

(54) METAL FILLED POROUS CARBON

(75) Inventors: Adam F. Gross, Los Angeles, CA (US); John J. Vajo, West Hills, CA (US); Robert W. Cumberland, Malibu, CA (US); Ping Liu, Irvine, CA (US); Tina T. Salguero, Encino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 400 days.

(21) Appl. No.: 12/168,830

(22) Filed: Jul. 7, 2008

Related U.S. Application Data

(60) Provisional application No. 60/948,436, filed on Jul. 6, 2007.

(51) Int. Cl.
*B32B 3/26* (2006.01)

(52) U.S. Cl. .............. 428/312.8; 428/304.4; 428/319.1; 428/457; 428/689; 623/11.11

(58) Field of Classification Search ................ None
See application file for complete search history.

(56) References Cited

U.S. PATENT DOCUMENTS

| | | | | |
|---|---|---|---|---|
| 5,282,861 A | * | 2/1994 | Kaplan | 623/23.51 |
| 5,782,830 A | * | 7/1998 | Farris | 606/99 |
| 6,974,625 B2 | * | 12/2005 | Hunter et al. | 428/304.4 |

* cited by examiner

*Primary Examiner* — Ling Xu
(74) *Attorney, Agent, or Firm* — Christie, Parker, Hale

(57) ABSTRACT

A porous carbon scaffold with a surface and pores, the porous carbon scaffold containing a primary metal and a secondary metal, where the primary metal is a metal that does not wet the surface of the pores of the carbon scaffold but wets the surface of the secondary metal, and the secondary metal is interspersed between the surface of the pores of the carbon scaffold and the primary metal.

8 Claims, 4 Drawing Sheets

METAL FILLED POROUS CARBON

CROSS REFERENCE TO RELATED APPLICATION

This application claims the benefit of the filing date of the U.S. Provisional Application No. 60/948,436, filed Jul. 6, 2007, the entire contents of which are hereby expressly incorporated by reference.

STATEMENT REGARDING FEDERALLY SPONSORED RESEARCH OR DEVELOPMENT

This invention was made with U.S. government support under Contract No. DE-RC36-05GO15067 awarded by the U.S. Department of Energy. The U.S. government has certain rights to this invention.

BACKGROUND OF THE INVENTION

This invention relates to the field of aerogels and more particularly to metal filled carbon scaffolds.

Carbon aerogels have high porosity and surface areas and therefore, are often used to create supercapacitors. Aerogel supercapacitors can have a very low impedance compared to normal supercapacitors and can absorb or produce very high peak currents. However, demand for more efficient energy storage has grown over the past few years. As a result, metals are used to fill the micro, meso, and nanoporous carbon materials (hereinafter jointly referred to as "nanoporous carbon scaffolds"). Metal filled nanoporous carbon scaffolds can also be useful for battery electrodes, hydrogen storage systems, catalyst supports, and metal matrix composites. However, there is a significant challenge in filling the nanoporous carbon scaffolds with metals as many metals do not wet well with carbon scaffolds.

Conventional processes of placing metals in carbon aerogels only result in a small amount of metal nanoparticles being incorporated within the carbon aerogels (hereinafter "aerogels" or "porous carbon scaffold"). One method of filling nanoporous carbon scaffolds with a metal involves the use of a solution of a metal precursor. Once the metal precursor is incorporated into the pores of the carbon scaffold it is then thermally decomposed or reduced. The thermal decomposition process results in voids hence, the presence of the metal in the pores is much less as compared to traditional processes of melting in or electroplating in a pure material. Other methods involve adhering carbon fibers to metal in metal matrix composites and hence are not directed toward porous carbon scaffolds having pore sizes less than 1 micron filled with metal. Another method involves the use of metal carbide compounds. In such a process, a primary metal is melted into a carbon scaffold by mixing the primary metal with a secondary metal to form metal carbide compounds. The metal carbide compounds are then reacted with the carbon scaffold. However, this method requires unwanted material to be placed in the porous carbon and also results in reaction between the secondary metal and carbon, which may damage the carbon scaffold.

Among the many demands for metal filled carbon aerogel, demand for more efficient and smaller energy storage devices has become increasing popular. Accordingly, there remains a need in the art for improved nano or mesostructured metals in a carbon scaffold, and improved processes for making the same.

SUMMARY OF INVENTION

In accordance to one aspect of the present invention, a porous carbon scaffold with a surface and pores is provided, the porous carbon scaffold containing a primary metal and a secondary metal, where the primary metal is a metal that may not wet the surface of the pores of the carbon scaffold well but wets the surface of the secondary metal, and the secondary metal is interspersed between the surface of the pores of the carbon scaffold and the primary metal.

In one embodiment, the carbon porous scaffold has the pores with an average pore size ranging from about 0.1 to about 1000 nanometers. The porous carbon scaffold has a total pore volume of between about 0.1 and about 10 $cm^3/g$.

In one embodiment, the primary metal fills between about 1% and about 100% of a pore volume of the porous carbon scaffold and the secondary metal fills between about 0.001% and about 10% of a pore volume of the porous carbon scaffold.

In one embodiment the primary metal is selected from the group consisting of Li, Na, K, Mg, Ca, Al, Ga, In, Sn, Pb, Cu, Zn, Ag, Cd, Au, Fe, Pt, Ru, Rh, Ir, Os, Ge and Bi and alloys of these metals. The secondary metal is selected from the group consisting of Ni, Co, Fe, Cu, Zn, Al, Ag, Cd, Au, Hg, Sn, Ge, Sb Ru, Rh, Ir, Os and Pb.

In accordance with another aspect of the present invention, a method of wetting the porous carbon scaffold with a secondary metal is provided. The method includes soaking an aerogel piece with a metal salt solution, which contains a mixture of a metal salt and a solvent, for a period of time to obtain a soaked aerogel piece, and heating the soaked aerogel piece with a reducing gas to obtain a wetted aerogel piece.

In one embodiment, the heating of the soaked aerogel piece is conducted at about 500° C. for about 2 hours with a reducing gas, where the reducing gas is a 1:9 vol/vol mixture of hydrogen and nitrogen gas. In another embodiment, the aerogel piece is soaked in the metal salt solution for about 4 hours to 5 days depending on the pore sizes of the porous carbon scaffold and the types of metal salt solution. In one embodiment, the porous carbon scaffold is soaked in a nickel nitrate solution for about 5 days. In another embodiment, the porous carbon scaffold is soaked in a stannous chloride solution for about 4 hours.

In one embodiment, the soaked aerogel piece is dried in a 100° C. oven prior to being heated with a reducing gas.

In accordance with still another aspect of the present invention, a method of filling the wetted porous carbon scaffold with a primary metal is provided. The method includes mixing the wetted aerogel piece with a metal to form a mixture, and reacting the mixture. In one embodiment, the mixture has a weight ratio of the wetted aerogel piece and metal at about 1:2.26 and the mixture is heated in a sealed container for about 60 hours (or 60 hours) at 850° C.

DETAILED DESCRIPTION

Figure 1:
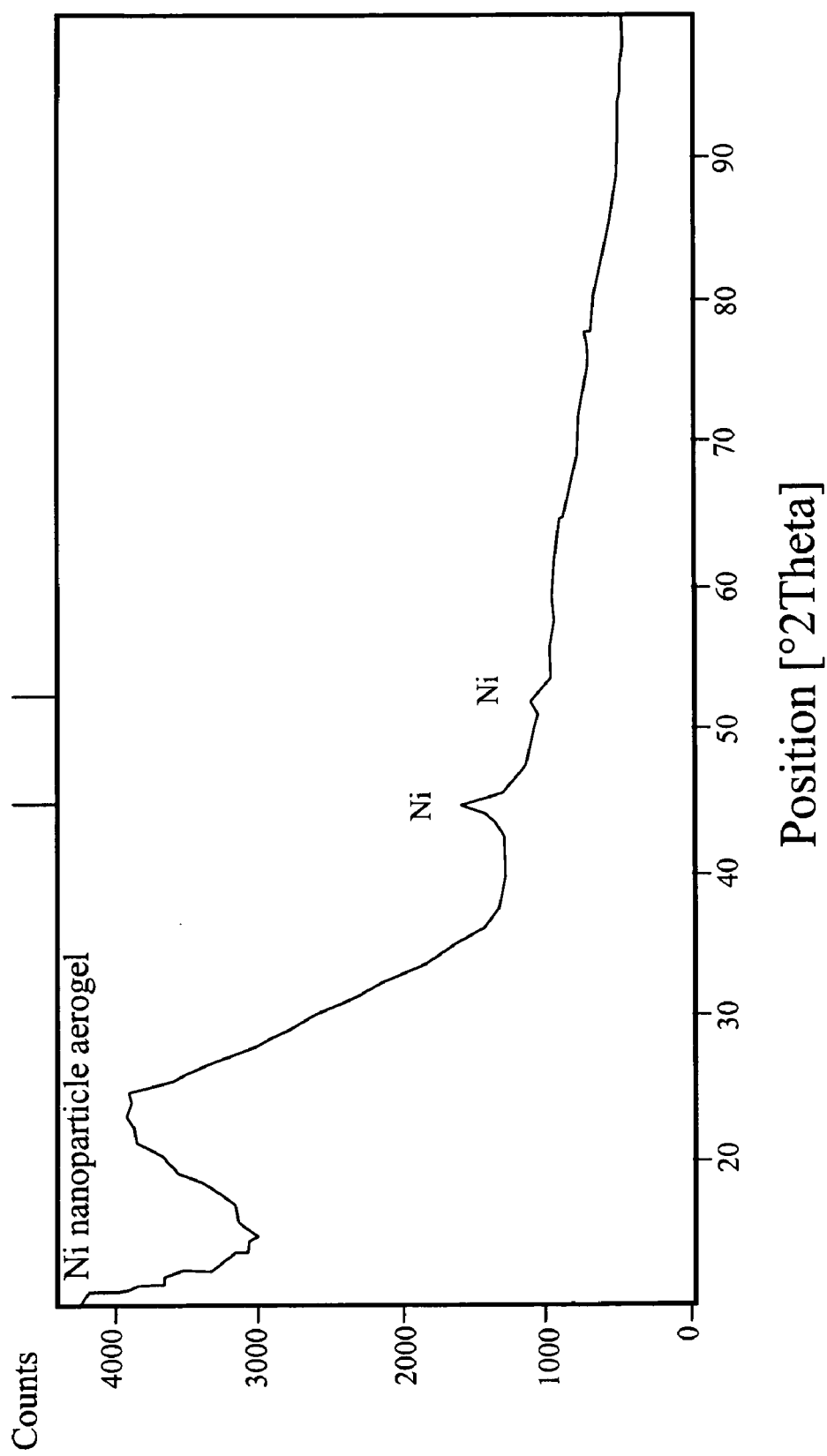
FIG. 1 is an X-ray diffraction pattern of a Ni nanoparticle incorporated in a porous carbon scaffold, e.g., a carbon aerogel structure.

Metal filled nanoporous carbon scaffolds are useful for supercapacitors, battery electrodes, hydrogen storage systems, and metal matrix composites.

Accordingly, in a first aspect, the invention provides a porous carbon scaffold having 1 to 100% pore volume filled with a primary and a secondary metal. In certain embodiments, the porous carbon scaffold has an average pore size ranging from about 0.1 nm to about 1000 nm (or 0.1 nm to 1000 nm), which is filled with the metals. Examples of suitable porous carbons are activated carbon, mesoporous carbons, carbon aerogels, carbon xerogels, and carbon foams.

In various embodiments, the pore size of the carbon ranges between about 0.1 and about 1000 nm, and the porous carbon comprises a scaffold with a total pore volume of between about 0.1 and about 10 $cm^3/g$. In certain embodiments, two metals are employed to increase the metal content or metal filling in the porous carbon scaffold. This is done because the same metal content or filling cannot be achieved using a single metal alone. Various metals are selected based on their compatibility with the porous carbon scaffold. The metal can be incompatible with the carbon scaffolds and hence cannot wet the carbon surface. Conversely, certain metals that form metal carbides (e.g., Ti or Li) will react with the carbon rather than filling the pores of the porous carbon scaffold thereby destroying the scaffold.

Accordingly, one aspect of the present invention provides a secondary metal that wets the carbon surface and a primary metal that wets the secondary metal and fills the pore space of the porous carbon scaffold. In one embodiment, primary metal could not wet or does not well on the carbon surface.

Nonlimiting examples of suitable secondary metals include, but are not limited to Ni, Co, Fe, Cu, Zn, Al, Ag, Cd, Au, Hg, Sn, Ge, Sb Ru, Rh, Ir, Os and Pb.

Nonlimiting examples of suitable primary metals include, but are not limited to Li, Na, K, Mg, Ca, Al, Ga, In, Sn, Pb, Cu, Zn, Ag, Cd, Au, Fe. Pt, Ru, Rh, Ir, Os, Ge, Bi, and alloys of these metals.

The primary metal is filled into the porous carbon to give the desired properties of the metal/carbon composite, and the secondary metal is a metal used to aid filling of the carbon with the primary metal. In one embodiment, the primary metal fills between about 1% and about 100% of the pore volume of the porous carbon scaffold. In another embodiment, the primary metal fills between 65-70% of the pore volume of the porous carbon scaffold. In one embodiment, the secondary metal fills trace amounts, e.g., between about 0.0001% to about 20% of the pore volume of the porous carbon scaffold. In one embodiment, the secondary metal fills between 0.001% to about 10% of the pore volume of the porous carbon scaffold.

In one embodiment, the secondary metal is applied to wet the surface of the porous carbon scaffold. In this way, more primary metal can fill the porous carbon scaffold easier. Wetting occurs when the cohesive energy between two materials is less than the cohesive energy of each material with itself. Thus the primary metal must be more energetically attracted to the secondary metal than to itself.

The secondary metal may be a continuous layer of metal or metal nanoparticle on the carbon surface. In one embodiment, the layer of secondary metal wets the carbon surface because it is incorporated as precursors in a liquid that can wet the porous carbon scaffold. Alternatively, the layer of secondary metal wets the carbon by reacting with the surface of the porous carbon. Once the secondary metal is applied and wetted the surface of the porous carbon, porous carbon is then filled with the primary metal. The primary metal can be applied through liquid phase incorporation of a molten metal, electrodeposition of a metal, or electroless deposition of a metal.

In one embodiment, the porous carbon scaffold has meso and nanostructured metal, which would not be possible without improved wetting from the secondary wetting metal layer.

In a second aspect, the invention provides a method of making a porous carbon filled with metal and the product formed thereby. The method involves a first step of wetting the porous carbon materials with a secondary metal and a second step of filling the porous carbon materials with a primary metal.

There are various methods of applying the secondary metal. According to one embodiment of the present invention, the method includes the use of a metal salt solution for incorporating the metal into the porous carbon scaffold. In this method, metal nanoparticles may be deposited by creating a solution of a metal salt, incorporating the solution into the porous scaffold, drying the material, and heating the metal salt filled porous carbon with a reducing gas. The resulting product is a porous scaffold filled with metal nanoparticles. Nonlimiting examples for suitable metals nanoparticles include, but are not limited to, Ni, Co, Fe, Cr, Sn, Zn, Cu, Ag, Sb, Ge, Cd, and Pb.

In another embodiment, a solution of metal nanoparticles is prepared. The solution is then incorporated into the aerogel followed by drying. In one exemplary embodiment, the metal nanoparticles are mixed in a solvent to obtain a solution and the solvent is evaporated or removed during the drying step. Nonlimitting examples of suitable nanoparticles used for this method include, but are not limited to, Co, Fe, Au, Pt, Ag, Pb and Pd.

According to another embodiment of the present invention, the method includes the deposition of metal nanoparticles and/or contiguous metallic coatings by electroless (chemical or auto-catalytic) plating method. Electroless plating often involves pre-treating the target/substrate with a coating of metal nanoparticles, which can eventually serve to catalyze the reduction of the metal salt in an electroless plating solution. The most common example of this is found in the electroless nickel plating process, where the substrate is often pre-treated with a coating of Pd nanoparticles. The deposition of the Pd nanoparticles is often achieved by a creating catalyst sites and using the catalyst sites for reduction of a metal salt to form a metal layer.

In one embodiment, the surface of the porous scaffold is first exposed to a palladium salt solution (e.g., $PdCl_2$), followed by exposure to a reducing salt solution such as stannous (II) chloride (or vice versa), or by heating the material that was soaked in a palladium salt solution in a reducing atmosphere. The resulting Pd nanoparticles then serve as catalyst sites for the reduction of a nickel salt (e.g. $NiSO_4$), forming a layer of Ni plate.

In additional to electroless Ni, autocatalytic plating techniques have been developed for several other metals, including Au, Ag, Ru, Pt, Cu, Rh, Co, Fe, and Zn. New techniques are also currently being developed which will enable electroless plating of Ir and Os.

According to yet another embodiment of the present invention, the method of applying the secondary metal on the surface of the porous scaffold includes electrodeposition. In this case, the porous carbon serves as the electrode. In one embodiment, a monolith of carbon aerogel can be used directly as the electrode. A plating solution, aqueous or non-aqueous based, is allowed to impregnate the pores of the electrode. When the potential of the electrode is biased to the reduction potential of the metal, electroplating takes place. Nonlimiting examples of suitable aqueous plating solutions having metal ions of the following material include, Au, Pt, Pd, Cu, Ni, Co, Zn, Ru, Ag, and Sn. Nonlimiting examples of suitable aqueous plating solutions include, but are not limited to, Mg and Al. In one embodiment, the thickness of the metal coating can be controlled by the amount of charge passed during plating. In another embodiment, the thickness of the metal coating can be controlled by the size of the pores of the porous carbon scaffold. The larger the size of the pores, the easier it is for the primary metal to infiltrate the pores thereby more metal can be deposited.

In one embodiment, nickel nitrate is used to form a layer of Ni nanoparticles as a secondary metal on an aerogel. In this embodiment nickel nitrate ($Ni(NO_3)_2.6H_2O$) is dissolved in acetone to make a solution having a concentration ranging from 0.05 to 1 M. In one embodiment, the nickel nitrate solution has a concentration of 0.2 M. An aerogel piece(s) is then obtained and soaked in the nickel nitrate solution for about 5 days. The soaked aerogel piece(s) is then removed and heated under reducing gas at a condition to reduce the salt to form a deposit of Ni as a secondary metal on the aerogel piece(s). In one embodiment, the weight to volume ratio of the aerogel piece(s) and solution ranges from 1:80 to 1:85 wt/vol. In another embodiment, the weight to volume ratio of the aerogel piece(s) and solution is about 1:83 wt/vol. In one embodiment, the soaked aerogel piece(s) is heated for 2 hours at about 500° C. with a 1:9 vol/vol mixture of $H_2$ and $N_2$ gas. In another embodiment, the soaked aerogel piece(s) is dried in a 100° C. oven before being heated with the reducing gas.

In yet another exemplary embodiment, a solution of about 0.25 M of stannous chloride is prepared and an aerogel piece (s) is soaked in the solution at a weight to volume ratio of about 1:95 to about 1:100. In one embodiment, the aerogel piece(s) is soaked in the solution at a weight to volume ratio of about 1:98. The soaked aerogel piece(s) are then dried and heated with reducing gas as described above to obtain an aerogel piece(s) coated with a layer of tin nanoparticles.

Once a wetting agent is applied, the aerogels are filled with the primary metal. There are various methods of applying the primary metal. According to one embodiment of the present invention, the method includes mixing a metal powder with the wetted aerogel to form a mixture followed by heating mixture to provide a metal filled aerogel. In various embodiments, the heating process can be carried up to the maximum melting temperature of the metal. Nonlimiting examples of suitable metals to be used in the process include, but are not limited to Li, Na, K, Mg, Al, Sn, and Cu. Other metals or metallic alloys with melting points below 1200° C. can also be used.

According to another embodiment of the present invention, the method of incorporating the primary metal includes electroless deposition of a metal. The electroless deposition allows plating of metals on aerogel surfaces. In one embodiment, the electroless deposition is performed following the wetting of a secondary metal of Pd nanoparticles. Nonlimiting examples of suitable metals to be used in the process include, but are not limited to Au, Ag, Ru, Pt, Cu, Rh, Co, Fe, Ni, Zn, Ir and Os.

According to yet another embodiment of the present invention, the method of applying the secondary metal on the surface of the porous scaffold includes electrodeposition. The process of applying the primary metal is similar to that for the secondary aerogel as described above. Nonlimiting examples of suitable metals to be used in the process include, but are not limited to Au, Pt, Pd, Cu, Ni, Co, Zn, Ru, Ag, Sn, Mg, and Al.

In one embodiment, a metal (e.g., Ni) coated or wetted aerogel piece is used as a wetted porous carbon scaffold to receive a primary metal filling. The wetted aerogel piece or wetted porous carbon scaffold is first dried under vacuum to evacuate residual solvents from a prior wetting process. The dried aerogel is then mixed with a metal (e.g., Mg) at a weight ratio ranging from about 1:2 to 1:2.5. In one embodiment the dried aerogel is mixed with a metal (e.g., Mg) at a weight ratio about 1:2.26. The mixture is then allowed to react in a sealed container, which is heated to a temperature of about 850° C. for about 60 hours to form a metal (e.g., Mg) filled carbon scaffold.

In various embodiments, a solution of metal salt is preferred to wet the porous carbon scaffold as capillary action facilitates the drawing of the liquid into and thereby filling the scaffold. As the liquid carrying metal in the form of dissolved salt and the liquid is removed only the metal salt is left behind in the porous scaffold. The metal salt is then reduced with an appropriate gas such as $H_2$ to form a metal deposited/wetted on the surface of the carbon scaffold. Once the wetted carbon scaffold is obtained, a liquid metal is added to the wetted carbon scaffold. Again the liquid metal will be drawn in the pores through capillary action. In this way, more metal can be added to the carbon scaffold as compared to conventional processes.

The following are nonlimiting examples of various embodiments of the invention.

EXAMPLES

Example 1

Ni Nanoparticles as a Secondary Metal 4.36 g of $Ni(NO_3)_2.6H_2O$ in 75 mL was dissolved acetone to make a 0.2 M solution. 0.902 g of aerogel pieces with an average pore size of 25 nm and a 1.3 cc/g pore volume was obtained and soaked in 75 mL of the 0.2M $Ni(NO_3)_2.6H_2O$ solution for 5 days. The soaked aerogel pieces were removed from the solution bath and dried in a 100° C. oven, followed by heating for 2 hours at 500° C. with 10% $H_2$/90% $N_2$ reducing gas to form a Ni decorated aerogel.

Example 2

Tin Nanoparticles as the Secondary Metal 2.82 g of $SnCl_2.2H2O$ were mixed in 50 mL acetone to make a 0.25 M solution. 0.51 g of aerogel pieces with an average pore size of 25 nm and a 1.3 cc/g pore volume was obtained and soaked in 50 mL of the 0.25M $SnCl_2.2H_2O$ solution for 4 hours. The soaked aerogel pieces were removed from the solution bath and heated for 2 hours at 500° C. with 10% $H_2$/90% $N_2$ reducing gas.

Example 3

Mg Filled Aerogel or Porous Carbon Scaffold Filled with Mg. The Nickel Nanoparticle Decorated Aerogel of Example 1 was Filled with Magnesium, as Follows 0.379 g of the Ni decorated aerogel of Example 1 was dried at 400° C. under vacuum for one hour. All the aerogel pieces were in the form of cubes 5 mm on each side. The dried aerogel pieces were placed in an inert atmosphere glove box and mixed with 0.857 g of Mg to form a mixture. The mixture was then placed in a ½" steel tube that was sealed at both ends with swagelock end caps. The sealed steel tube was heated for 60 hours at 850° C. The steel tube was placed back in an inert atmosphere glove box, cut open, and the aerogel cubes were removed. The sides of the cubes were scraped with a razor blade to remove excess Mg and the material was analyzed.
Test Example 1 test result: The X-ray diffraction image (XRD) pattern of this aerogel is shown in FIG. 1. In FIG. 1, the wide Ni XRD peaks are indicative of nanoparticle sized Ni. All peaks index to Ni and no unexplained peaks are present. The aerogel was combusted in air using thermogravimetric analysis and the residual mass indicated the aerogel contained 2.3 wt % Nickel.

Figure 2:
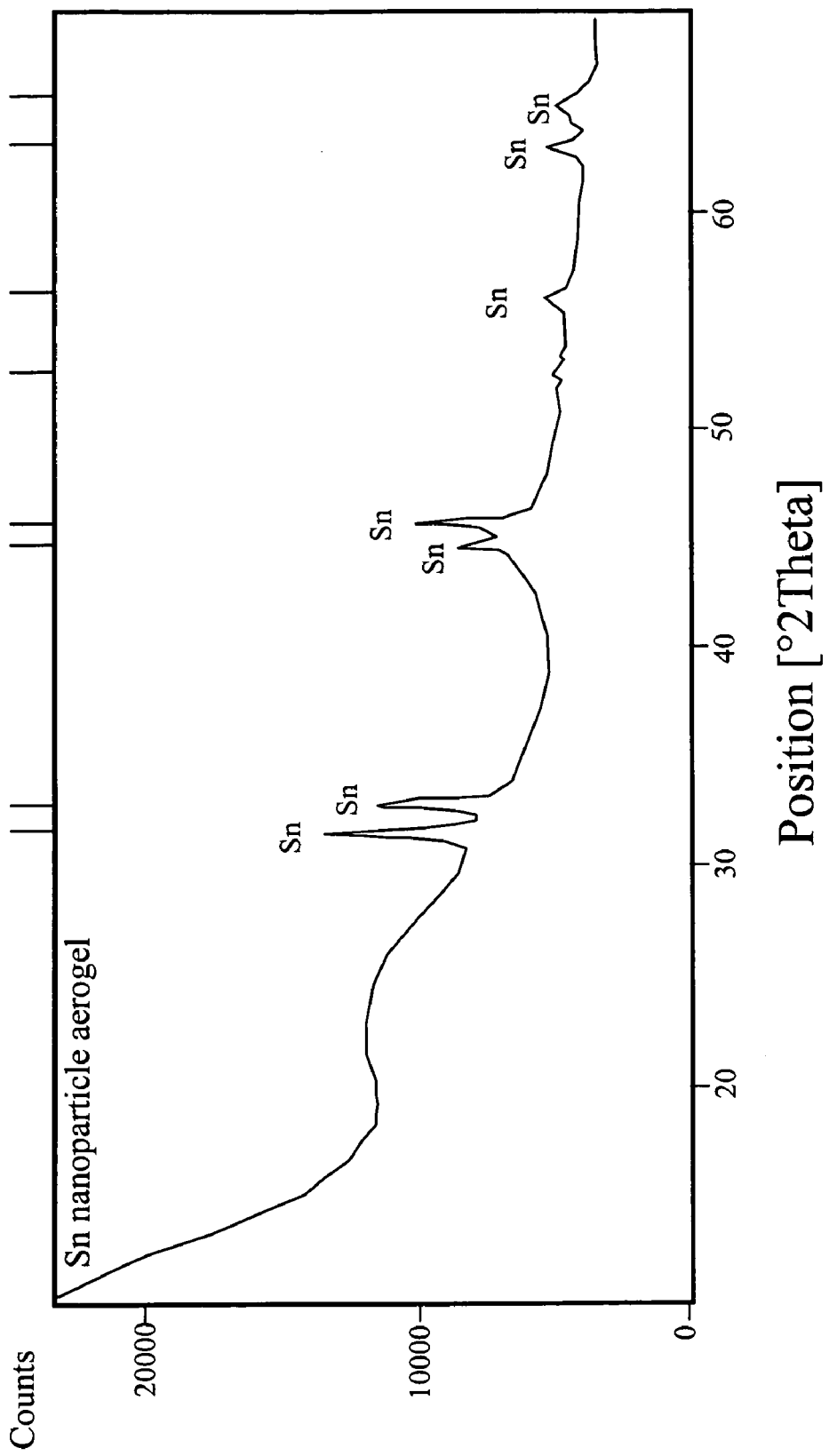
FIG. 2 is an X-ray diffraction pattern of a tin nanoparticle incorporated in a porous carbon scaffold, e.g., a carbon aerogel structure.

Example 2 test result: The XRD pattern of this aerogel is shown in FIG. 2. In FIG. 2, the wide Sn XRD peaks are indicative of nanoparticle sized Sn (tin). All peaks index to tin and the large peak width indicates that all tin particles are nanoparticles. The aerogel was combusted in air using thermogravimetric analysis and the residual mass indicated the aerogel contained 5.0 wt % Sn.

Figure 3:
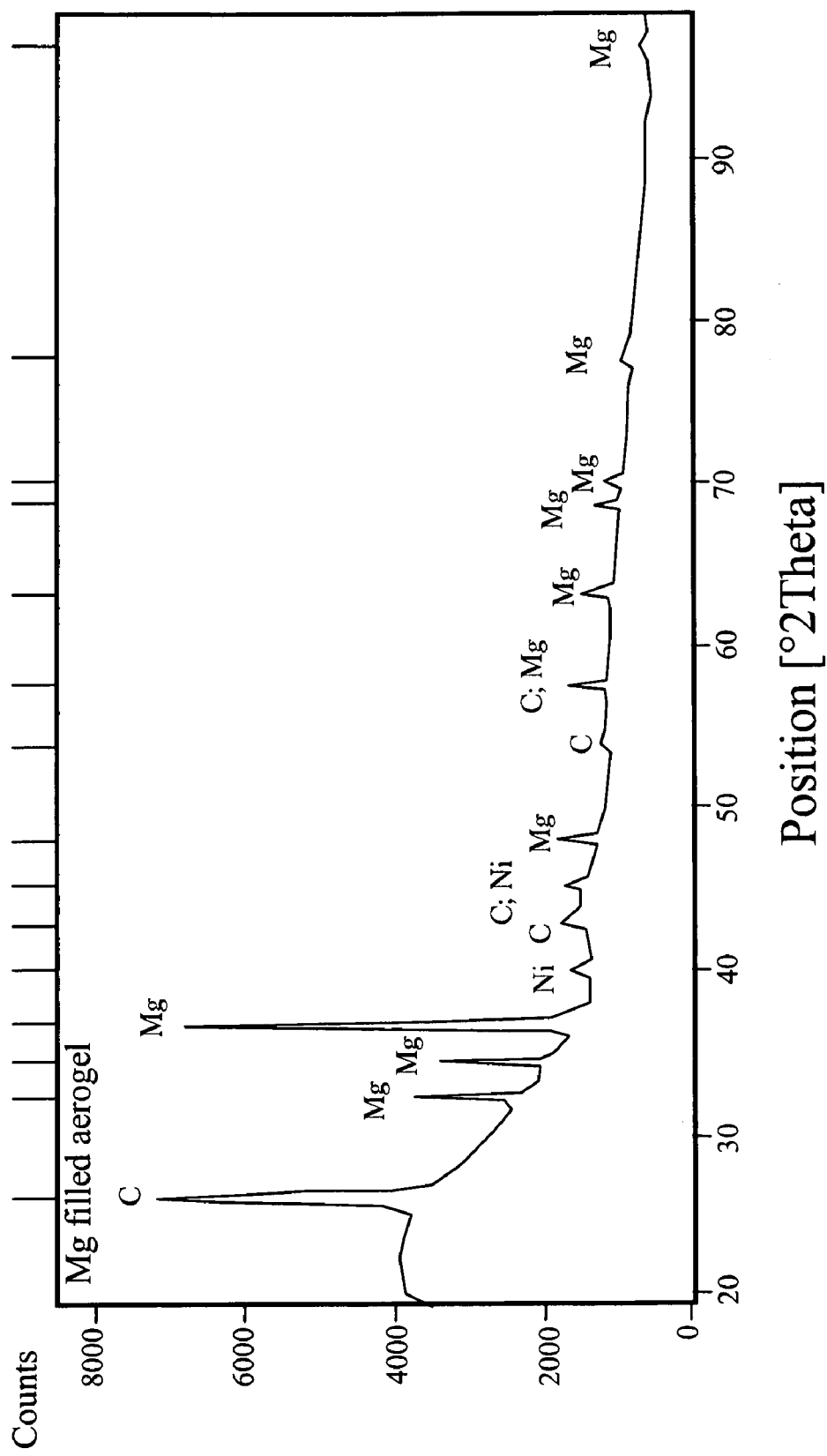
FIG. 3 is an X-ray diffraction pattern of a magnesium filled porous carbon scaffold, e.g., a magnesium filled aerogel structure.

Example 3 test result: The XRD pattern of this aerogel is shown in FIG. 3. In FIG. 3, the Ni peaks are from the Ni secondary metal and the C peaks are from the aerogel, whereas the Mg peaks are newly formed metals in the aerogel. The XRD in FIG. 3 shows that Mg was incorporated into the aerogel and no oxidation occurred.

Figure 4:
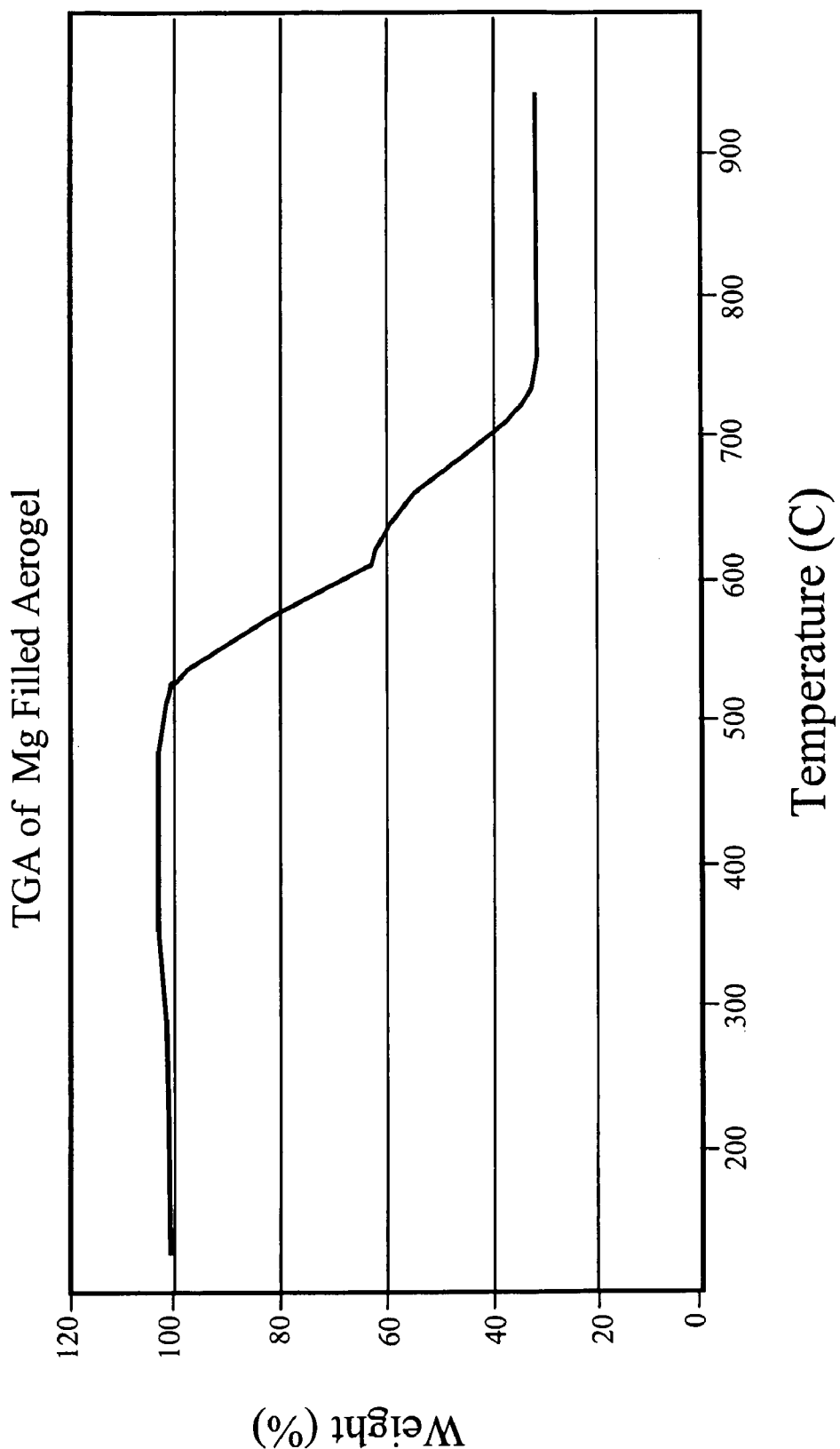
FIG. 4 is a thermogravimetric analysis of a magnesium filled porous carbon scaffold, e.g., a magnesium filled aerogel structure.

The aerogel was combusted in air using thermogravimetric analysis and the residual mass was measured. This data is shown in FIG. 4. Thermogravimetric analysis of a magnesium filled carbon aerogel. The residual mass of the Nickel aerogel was subtracted from the residual mass of this Mg filled aerogel and it was determined that the aerogel contained 16.4 wt % magnesium.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:

1. A porous carbon scaffold with a surface and pores, the porous carbon scaffold containing a primary metal and a secondary metal differing from the primary metal, wherein:
   the primary metal wets the surface of the secondary metal; and
   the secondary metal wets the surface of the pores of the porous carbon and is interspersed between the surface of the pores of the porous carbon scaffold and the primary metal.

2. The porous carbon scaffold of claim 1, wherein the pores have an average size between about 0.1 and about 1000 nanometers.

3. The porous carbon scaffold of claim 1, wherein the porous carbon scaffold has a total pore volume of between about 0.1 and about 10 cm$^3$/g.

4. The porous carbon scaffold of claim 1, wherein the primary metal fills between about 1% and about 100% of a pore volume of the porous carbon scaffold.

5. The porous carbon scaffold of claim 1, wherein the primary metal fills between about 65% and about 70% of a pore volume of the porous carbon scaffold.

6. The porous carbon scaffold of claim 1, wherein the secondary metal fills between about 0.001% and about 10% of a pore volume of the porous carbon scaffold.

7. The porous carbon scaffold of claim 1, wherein the primary metal is selected from the group consisting of Li, Na, K, Mg, Ca, Al, Ga, In, Sn, Pb, Cu, Zn, Ag, Cd, Au, Fe. Pt, Ru, Rh, Ir, Os, Ge and Bi and alloys of these metals.

8. The porous carbon scaffold of claim 1, wherein the secondary metal is selected from the group consisting of Ni, Co, Fe, Cu, Zn, Al, Ag, Cd, Au, Hg, Sn, Ge, Sb Ru, Rh, Ir, Os and Pb.

* * * * *